United States Patent
Yashima

(10) Patent No.: US 9,962,786 B2
(45) Date of Patent: May 8, 2018

(54) ARC WELDING METHOD, ARC WELDING APPARATUS, AND ARC WELDING CONTROLLER

(71) Applicant: Kobe Steel, Ltd., Kobe-shi (JP)

(72) Inventor: Takashi Yashima, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days. days.

(21) Appl. No.: 14/994,778

(22) Filed: Jan. 13, 2016

(65) Prior Publication Data

US 2016/0250708 A1     Sep. 1, 2016

(30) Foreign Application Priority Data

Feb. 27, 2015   (JP) ................................. 2015-038769

(51) Int. Cl.
| | |
|---|---|
| *B23K 9/16* | (2006.01) |
| *B23K 9/10* | (2006.01) |
| *B23K 9/09* | (2006.01) |
| *B23K 9/095* | (2006.01) |
| *B23K 9/12* | (2006.01) |
| *B23K 9/173* | (2006.01) |

(52) U.S. Cl.
CPC ............... *B23K 9/16* (2013.01); *B23K 9/092* (2013.01); *B23K 9/0953* (2013.01); *B23K 9/1006* (2013.01); *B23K 9/125* (2013.01); *B23K 9/173* (2013.01)

(58) Field of Classification Search
CPC .... B23K 9/091; B23K 9/1336; B23K 33/004; B23K 9/32

USPC ............... 219/60 R, 69.1, 74, 76.14, 121.11, 219/121.13, 121.14, 121.56, 121.53, 219/137.2, 130.51, 137.7, 137 R, 136
See application file for complete search history.

(56) References Cited

U.S. PATENT DOCUMENTS

| | | | | |
|---|---|---|---|---|
| 3,627,978 A | * | 12/1971 | Endo ...................... | B23K 9/125 219/137 PS |
| 4,531,045 A | * | 7/1985 | Kemp ................... | B23K 9/067 219/132 |

(Continued)

FOREIGN PATENT DOCUMENTS

| | | |
|---|---|---|
| JP | 59-85372 A | 5/1984 |
| JP | 2-41776 | 2/1990 |

(Continued)

OTHER PUBLICATIONS

Extended European Search Report dated Aug. 16, 2016 in Patent Application No. 16000123.6.

*Primary Examiner* — David Angwin
*Assistant Examiner* — Jimmy Chou
(74) *Attorney, Agent, or Firm* — Oblon, McClelland, Maier & Neustadt, L.L.P.

(57) ABSTRACT

In an arc welding method of performing welding by employing $CO_2$ gas as shield gas, supplying a welding current to flow between a welding wire and a workpiece to be welded while feeding the welding wire toward the workpiece, and generating an arc with the welding current, the arc welding method includes a welding step of performing the welding of the workpiece while executing control to adjust the welding current, and a welding termination step of executing control to apply the welding current having a trapezoidal waveform when the welding of the workpiece is terminated.

10 Claims, 9 Drawing Sheets

(56) References Cited

U.S. PATENT DOCUMENTS

| | | | | |
|---|---|---|---|---|
| 4,877,941 A * | 10/1989 | Honma | B23K 9/1075 | 219/130.21 |
| RE33,330 E * | 9/1990 | Ogasawara | B23K 9/0956 | 219/130.21 |
| 5,525,778 A * | 6/1996 | Matsui | B23K 9/092 | 219/130.51 |
| 8,203,099 B2 * | 6/2012 | Peters | B23K 9/04 | 219/130.1 |
| 8,513,568 B2 * | 8/2013 | Kawamoto | B23K 9/0731 | 219/125.1 |
| 9,035,220 B2 * | 5/2015 | Schorghuber | B23K 9/124 | 219/136 |
| 2003/0029851 A1 * | 2/2003 | Suzuki | B23K 9/26 | 219/130.01 |
| 2004/0060913 A1 * | 4/2004 | Ueyama | B23K 9/092 | 219/130.21 |
| 2005/0269306 A1 * | 12/2005 | Fulmer | B23K 9/09 | 219/130.51 |
| 2007/0062922 A1 * | 3/2007 | Zamuner | B23K 9/123 | 219/137.31 |
| 2007/0246448 A1 * | 10/2007 | Nishisaka | B23K 9/092 | 219/130.51 |
| 2008/0006612 A1 * | 1/2008 | Peters | B23K 9/04 | 219/76.14 |
| 2008/0142490 A1 * | 6/2008 | Suzuki | B23K 9/09 | 219/74 |
| 2008/0223829 A1 * | 9/2008 | Wilhelm | B23K 9/073 | 219/74 |
| 2009/0166344 A1 * | 7/2009 | Hamalainen | B23K 9/092 | 219/130.51 |
| 2009/0321401 A1 * | 12/2009 | Peters | B23K 9/092 | 219/137 PS |
| 2009/0321402 A1 * | 12/2009 | Doyle | B23K 9/0282 | 219/137 PS |
| 2011/0108527 A1 * | 5/2011 | Peters | B23K 9/09 | 219/73.2 |
| 2011/0174784 A1 * | 7/2011 | Kamei | B23K 1/14 | 219/74 |
| 2011/0253679 A1 * | 10/2011 | Yamazaki | B23K 9/09 | 219/74 |
| 2012/0145690 A1 * | 6/2012 | Kawamoto | B23K 9/067 | 219/130.5 |
| 2012/0223063 A1 * | 9/2012 | Tanaka | B23K 9/073 | 219/130.01 |
| 2012/0255940 A1 * | 10/2012 | Fujiwara | B23K 9/1012 | 219/137 R |
| 2013/0068744 A1 * | 3/2013 | Matsui | B23K 9/092 | 219/137 R |
| 2013/0119034 A1 * | 5/2013 | Peters | B23K 13/08 | 219/130.1 |
| 2013/0180971 A1 * | 7/2013 | Peters | B65H 51/10 | 219/137.7 |
| 2013/0228555 A1 * | 9/2013 | Peters | B23K 9/092 | 219/74 |
| 2013/0228558 A1 * | 9/2013 | Daniel | B23K 9/025 | 219/130.21 |
| 2014/0116999 A1 * | 5/2014 | Suzuki | B23K 9/0209 | 219/124.1 |
| 2014/0124492 A1 * | 5/2014 | Daniel | B23K 9/095 | 219/130.51 |
| 2014/0151349 A1 * | 6/2014 | Ma | B23K 9/09 | 219/137.2 |
| 2014/0203003 A1 * | 7/2014 | Fujiwara | B23K 9/09 | 219/125.1 |
| 2014/0203004 A1 * | 7/2014 | Matsuoka | B23K 9/092 | 219/130.01 |
| 2014/0312020 A1 * | 10/2014 | Daniel | B23K 9/0737 | 219/124.02 |
| 2015/0096966 A1 * | 4/2015 | Fujiwara | B23K 9/173 | 219/130.51 |
| 2015/0343549 A1 * | 12/2015 | Henry | B23K 9/1735 | 219/130.51 |

FOREIGN PATENT DOCUMENTS

| | | |
|---|---|---|
| JP | 2007-313513 A | 12/2007 |
| JP | 2011-189392 | 9/2011 |
| KR | 10-1045122 B1 | 6/2011 |
| KR | 10-2014-0136378 A | 11/2014 |

* cited by examiner

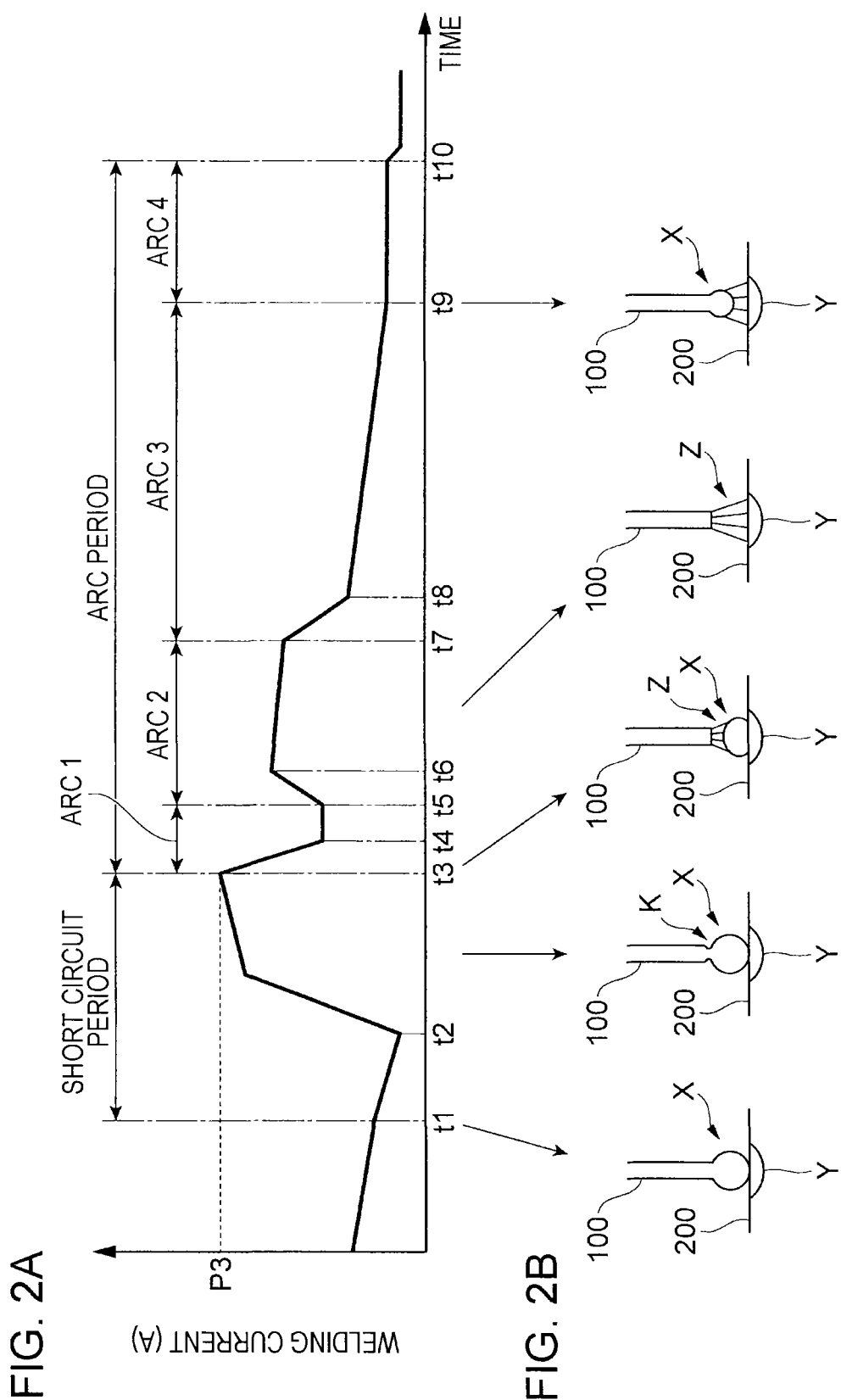

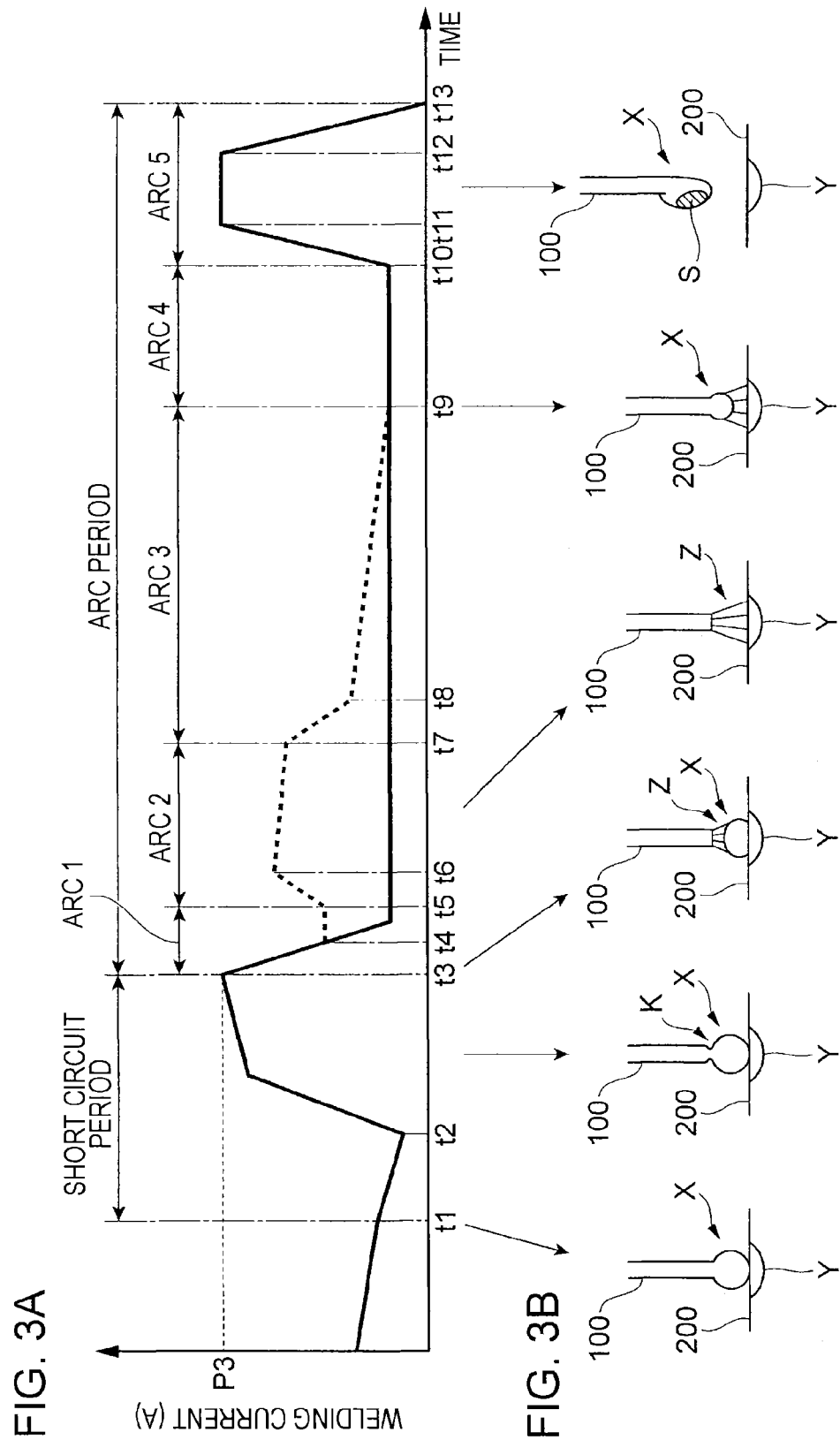

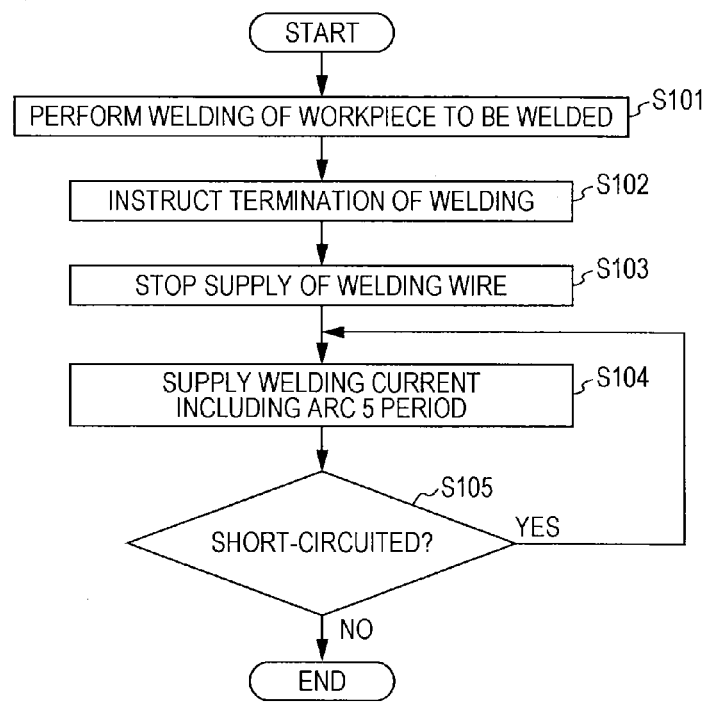

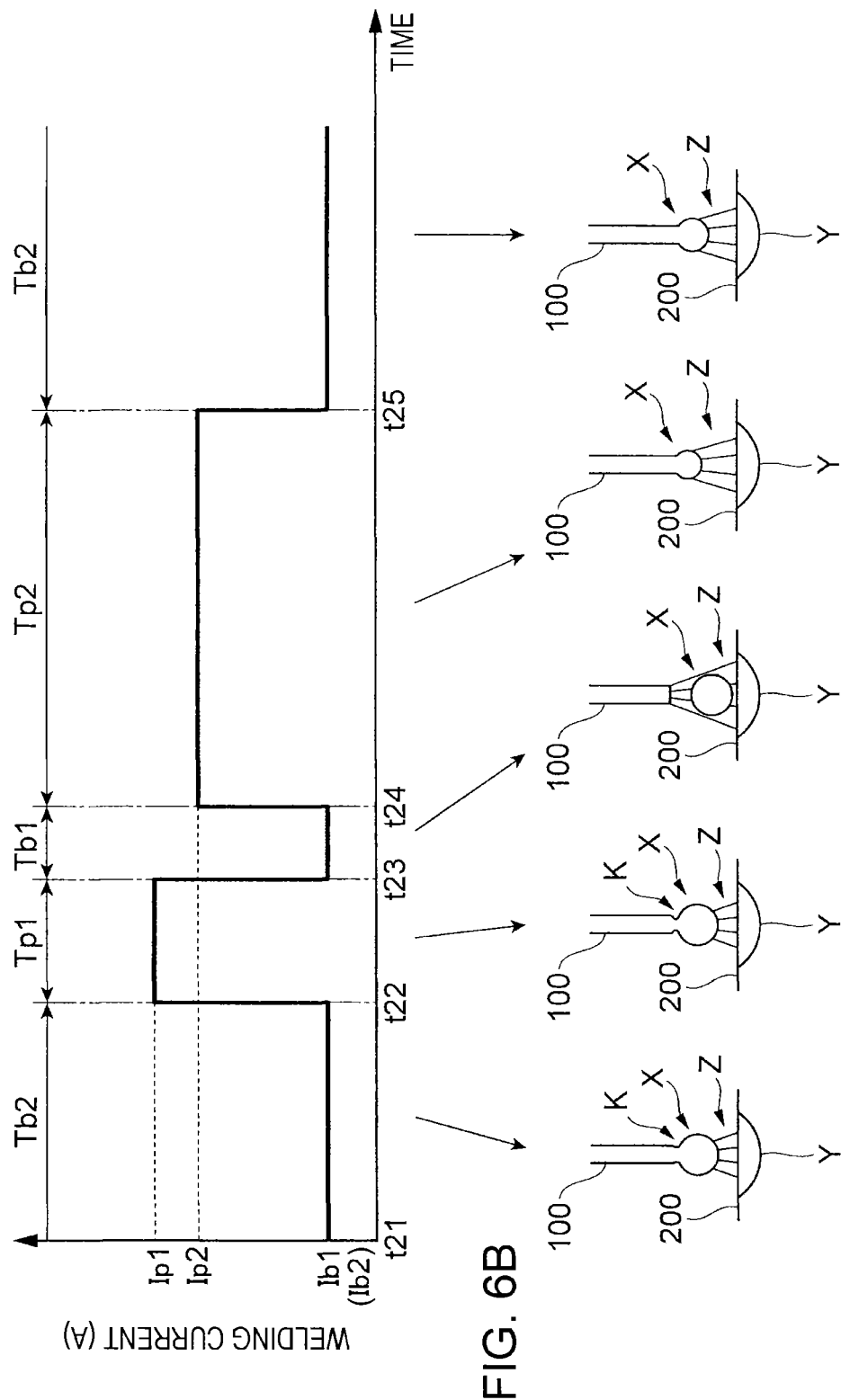

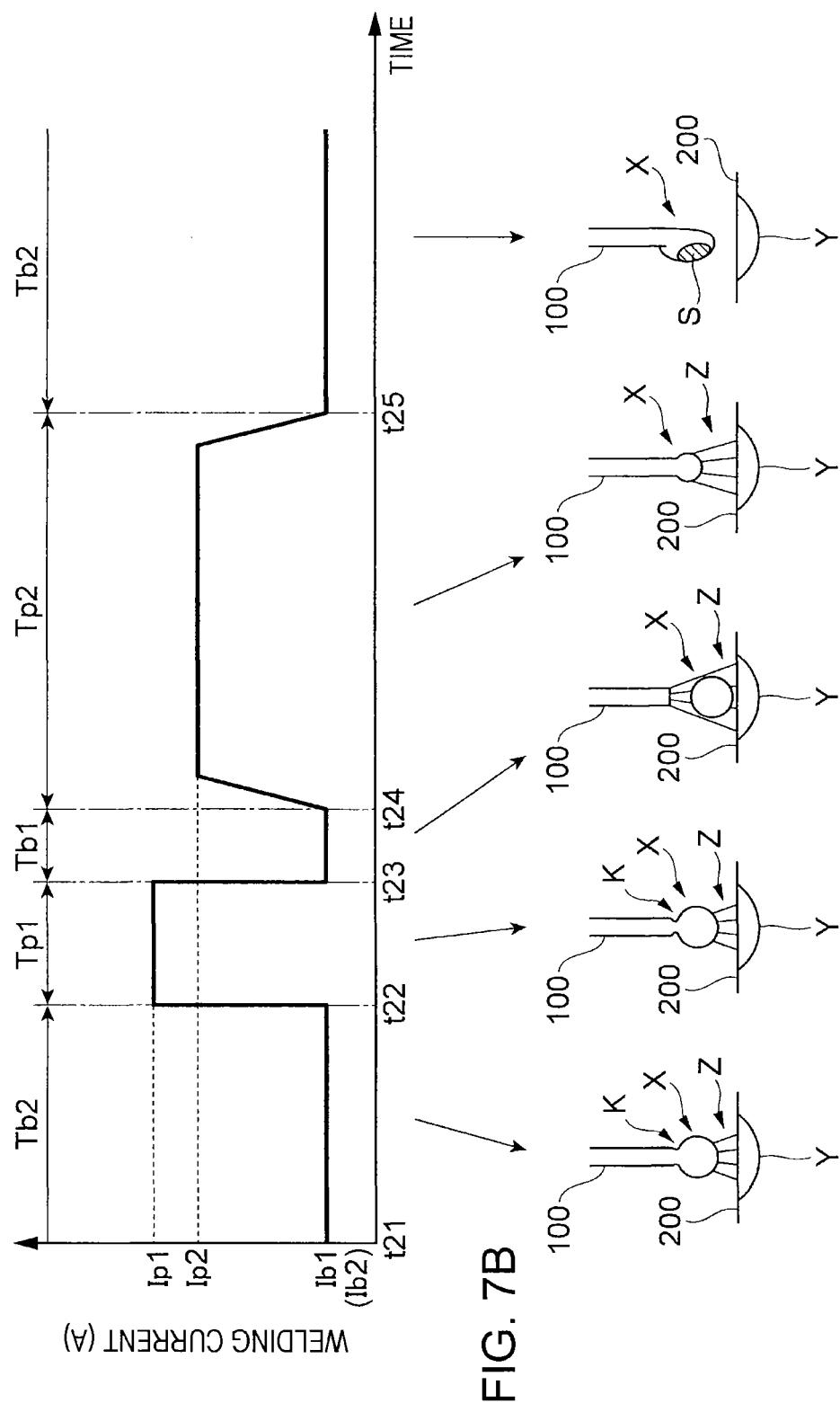

FIG. 9

| | Time A (ms) | Current Value B (A) | Time C (ms) | Time D (ms) | Current Value E (A) | Incidence of Arc Start Failure | Slag |
|---|---|---|---|---|---|---|---|
| EXAMPLE 1 | 1.0 | 120 | 5.0 | 1.0 | 20 | ○ | bottom |
| EXAMPLE 2 | 2.0 | 120 | 5.0 | 1.0 | 20 | ○ | bottom |
| EXAMPLE 3 | 5.0 | 120 | 5.0 | 1.0 | 20 | △ | bottom |
| EXAMPLE 4 | 2.0 | 150 | 3.0 | 0.1 | 1.0 | △ | bottom |
| EXAMPLE 5 | 2.0 | 200 | 3.0 | 0.1 | 1.0 | △ | bottom |
| EXAMPLE 6 | 2.0 | 250 | 3.0 | 0.1 | 1.0 | ◎ | side |
| EXAMPLE 7 | 2.0 | 300 | 3.0 | 0.1 | 1.0 | ◎ | side |
| EXAMPLE 8 | 2.0 | 300 | 0.1 | 0.1 | 1.0 | △ | bottom |
| EXAMPLE 9 | 2.0 | 300 | 1.0 | 0.1 | 1.0 | ○ | side |
| EXAMPLE 10 | 2.0 | 300 | 3.0 | 0.1 | 1.0 | ◎ | side |
| EXAMPLE 11 | 2.0 | 300 | 3.0 | 0.1 | 1.0 | ◎ | side |
| EXAMPLE 12 | 2.0 | 300 | 3.0 | 1.0 | 1.0 | ◎ | side |
| EXAMPLE 13 | 2.0 | 300 | 3.0 | 3.0 | 1.0 | ○ | side |
| EXAMPLE 14 | 2.0 | 300 | 3.0 | 10.0 | 1.0 | △ | side |
| EXAMPLE 15 | 2.0 | 120 | 3.0 | 0.1 | 1.0 | △ | side |
| EXAMPLE 16 | 2.0 | 120 | 3.0 | 1.0 | 1.0 | ○ | side |
| EXAMPLE 17 | 2.0 | 120 | 3.0 | 3.0 | 1.0 | ◎ | side |
| EXAMPLE 18 | 2.0 | 120 | 3.0 | 10.0 | 1.0 | △ | side |
| EXAMPLE 19 | 2.0 | 300 | 3.0 | 0.1 | 1.0 | ◎ | side |
| EXAMPLE 20 | 2.0 | 300 | 3.0 | 0.1 | 20 | △ | side |
| EXAMPLE 21 | 2.0 | 300 | 3.0 | 0.1 | 50 | △ | side |
| COMPARATIVE EXAMPLE | — | — | — | — | — | × (5%) | bottom |

ARC WELDING METHOD, ARC WELDING APPARATUS, AND ARC WELDING CONTROLLER

BACKGROUND OF THE INVENTION

1. Field of the Invention

The present invention relates to an arc welding method, an arc welding apparatus, and an arc welding controller.

2. Description of the Related Art

In gas shielded arc welding of consumable electrode type, for example, when starting a welding operation, an arc is started as follows. A welding wire and a workpiece to be welded are contacted with each other in a state where a voltage is applied between them, thus causing a short circuit current to flow. The welding wire is fused by the short circuit current, whereby an arc is generated between the welding wire and the workpiece.

As one related-art technique disclosed in a publication, there is a gas shielded arc welding method of supplying a welding output, which is held at a constant voltage through feedback control, to a welding load formed by a consumable electrode fed with driving of an electrode feed motor and by a parent material to be welded, in a way of alternately generating a short circuit and an arc between the parent material and the electrode, thus welding the parent material while the generated arc is gas-shielded, wherein when the driving of the motor and the constant voltage control of the welding output are stopped in accordance with stop of the welding, a slag deposited position is controlled by feedback controlling the welding output to be held at a constant current until the lapse of a predetermined solidification control time from the stop of the welding (see Japanese Unexamined Patent Application Publication No. 2-41776).

As another related-art technique disclosed in a publication, there is a pulse arc welding method of performing welding by repeatedly supplying a peak current not less than a critical value and a base current less than the critical value to a welding wire (see Japanese Unexamined Patent Application Publication No. 2011-189392). More specifically, in a method of controlling termination of pulse arc welding, the method being carried out to terminate the welding by supplying a predetermined final base current within a range less than a critical value for a predetermined final base period upon, at the time of terminating the welding, determination that a final peak current has been supplied, the final base current is set to a current having a value that increases with the lapse of time during the final base period.

SUMMARY OF THE INVENTION

When the arc welding is terminated, a droplet formed at an end of the welding wire is cooled and solidified. At that time, a slag component and a solution component contained in the droplet are partly oxidized, and slag (metal oxide), which is an insulator, is formed. The formed slag tends to concentrate in a lower portion of the droplet due to a difference in gravity. In many cases, the slag concentrates at the end of the welding wire and forms an insulating film. When the arc welding is started again, the insulating film impedes flow of the short circuit current, and an arc start failure may occur in some cases.

An object of the present invention is to suppress the occurrence of an arc start failure at the start of an arc even with slag being generated when arc welding is terminated.

The present invention provides an arc welding method of performing welding by employing $CO_2$ gas as shield gas, supplying a welding current to flow between a welding wire and a workpiece to be welded while feeding the welding wire toward the workpiece, and generating an arc with the welding current, the arc welding method including a welding step of performing the welding of the workpiece while executing control to adjust the welding current, and a welding termination step of executing control to apply the welding current having a trapezoidal waveform when the welding of the workpiece is terminated.

In the welding termination step, the welding current having the trapezoidal waveform may be additionally applied upon occurrence of a short circuit when the welding of the workpiece is terminated.

In the welding termination step, the welding current having the trapezoidal waveform may be applied in an arc period during which an arc is generated after a short circuit period during which a short circuit occurs.

In the welding termination step, the welding current during the arc period may be a constant current.

The trapezoidal waveform may include a first period during which the welding current is linearly increased, a second period during which the welding current is a constant current, and a third period during which the welding current is linearly decreased. The first period may be selected from a range of not shorter than 0.5 ms and not longer than 2.0 ms, the second period may be selected from a range of not shorter than 1.0 ms and not longer than 5.0 ms, and the third period may be selected from a range of not shorter than 0.5 ms and not longer than 2.0 ms.

The welding current during the second period may be selected from a range of not less than 250 A and not more than 300 A, and the welding current before the first period and the welding current after the third period may be each selected from a range of more than 0 A and not more than 50 A.

In the welding termination step, the waveform of the welding current may include a rectangular waveform and the trapezoidal waveform.

The present invention further provides an arc welding apparatus including welding means configured to perform welding by employing $CO_2$ gas as shield gas, supplying a welding current to flow between a welding wire and a workpiece to be welded while feeding the welding wire toward the workpiece, and generating an arc with the welding current, a power supply unit configured to supply the welding current to the workpiece through the welding wire, and a current control unit configured to execute control of adjusting the welding current when the welding is performed on the workpiece, and control of applying the welding current having a trapezoidal waveform when the welding of the workpiece is terminated.

The present invention still further provides an arc welding controller for controlling a welding current in a welding apparatus that is configured to perform welding by employing $CO_2$ gas as shield gas, supplying the welding current to flow between a welding wire and a workpiece to be welded while feeding the welding wire toward the workpiece, and generating an arc with the welding current, the arc welding controller including a power supply unit configured to supply the welding current to the workpiece through the welding wire, and a current control unit configured to execute control of adjusting the welding current when the welding is performed on the workpiece, and control of applying the welding current having a trapezoidal waveform when the welding of the workpiece is terminated.

According to the present invention, the arc welding method, the arc welding apparatus, and the arc welding controller can be obtained which can suppress the occurrence of an arc start failure attributable to slag that is generated when the arc welding is terminated.

BRIEF DESCRIPTION OF THE DRAWINGS

FIG. 2A is a chart depicting one example of the waveform of a welding current output from a power supply during arc welding, and FIG. 2B successively illustrates states of an end of a welding wire in time sequence during the arc welding;

FIG. 3A is a chart depicting one example of the waveform of the welding current when the arc welding is terminated, and FIG. 3B successively illustrates states of the end of the welding wire in time sequence when the arc welding is terminated;

FIG. 5 is a flowchart referenced to explain an arc welding method according to the embodiment;

FIG. 6A is a chart depicting another example of the waveform of the welding current output from the power supply during the arc welding, and FIG. 6B successively illustrates states of the end of the welding wire in time sequence during the arc welding;

FIG. 7A is a chart depicting another example of the waveform of the welding current when the arc welding is terminated, and FIG. 7B successively illustrates states of the end of the welding wire in time sequence when the arc welding is terminated;

FIG. 9 lists results of studying parameters A, B, C, D and E.

DESCRIPTION OF THE PREFERRED EMBODIMENTS

<Overall Configuration of Welding System>

An embodiment of the present invention will be described in detail below with reference to the accompanying drawings.

Figure 1:
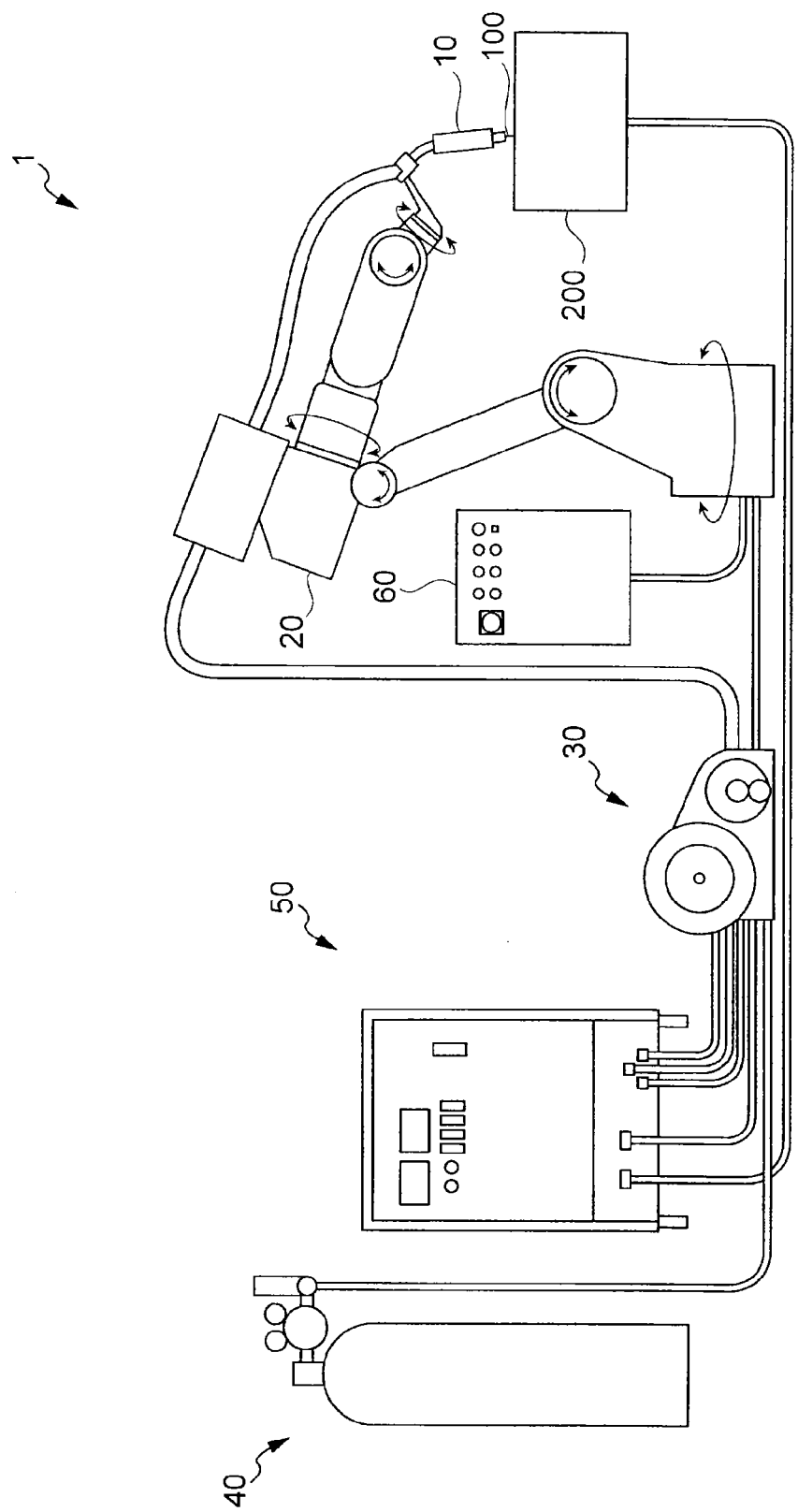
FIG. 1 illustrates, in a schematic form, a configuration of a welding system according to an embodiment of the present invention.

FIG. 1 illustrates, in a schematic form, a configuration of a welding system 1 according to the embodiment of the present invention.

The welding system 1 performs welding of a workpiece 200 to be welded by employing a gas shielded arc welding method of consumable electrode type (electrode fusing type), more specifically a carbon dioxide arc welding method using carbon dioxide ($CO_2$ gas) as shield gas.

The welding system 1 as one example of an arc welding apparatus includes a welding torch 10 that welds the workpiece 200 by employing a welding wire 100, a robot arm 20 that holds the welding torch 10 and sets a position and a posture of the welding torch 10, a wire feeder 30 that feeds the welding wire 100 to the welding torch 10, a shield gas supply apparatus 40 that supplies the shield gas (carbon dioxide in the embodiment) to the welding torch 10, and a power supply 50 that supplies a welding current to the welding wire 100 through the welding torch 10, and that controls the welding current, a feed speed, a welding speed, etc.

The welding system 1 further includes a robot controller 60 that controls a welding operation performed on the workpiece 200 by both the welding torch 10 and the robot arm 20. The robot controller 60 controls the robot arm 20, thereby controlling the movement and the speed (welding speed) of the welding torch 10 (i.e., the welding wire 100) mounted to the robot arm 20. The robot controller 60 and the power supply 50 can be configured to be able to transmit and receive data and control signals between them.

Herein, the welding torch 10, the wire feeder 30, and the shield gas supply apparatus 40 can be regarded as welding means configured to perform welding by generating an arc with a welding current.

<Power Supply>

When an operator instructs termination of the welding, the wire feed is stopped. However, because the wire is not immediately stopped due to inertia, the waveform of a pulse current, illustrated in FIG. 3A, is output during an arc period until the wire is completely stopped.

After generation of the arc is stopped, a droplet formed or remaining at an end of the welding wire 100 is cooled and solidified. At that time, slag being an insulator is solidified on a surface of the droplet, and an insulating film is formed on the droplet surface. The insulating film tends to be formed at a bottom end of the droplet, namely in a portion of the droplet where the welding wire 100 is positioned closest to the workpiece 200. When the operator instructs a start of the welding (arc start) to restart the arc welding, the insulating film impedes electrical conduction between the welding wire 100 and the workpiece 200. As a result, a short circuit current is impeded from flowing between the welding wire 100 and the workpiece 200. This may lead to an event that the welding cannot be restarted, or an event that a tip and the wire are fused to each other after an arc has occurred temporarily. Those events are collectively called an "arc start failure". The arc start failure causes degradation of quality of the arc welding and reduction of productivity.

In view of the above problem, the waveform of a current output from the power supply 50 is controlled in this embodiment, as described below, to control a position where the insulator is formed at the end of the welding wire 100 when the welding is terminated, thereby suppressing the occurrence of the arc start failure.

FIG. 2A is a chart depicting one example of the waveform of the welding current output from the power supply 50 during the arc welding. In FIG. 2A, a horizontal axis represents time, and a vertical axis represents a value of the welding current. In the example of FIG. 2A, the welding current is increased and decreased under a constant voltage.

FIG. 2B successively illustrates states of the end of the welding wire 100 in time sequence during the arc welding.

In the arc welding, a short circuit period and an arc period are alternately repeated. In the short circuit period, the droplet at the end of the welding wire 100 and the workpiece 200 are contacted with each other, thus generating a short circuit state where the short circuit current flows. In the arc period, the droplet transfers from the welding wire 100 to a molten weld pool formed in the workpiece, whereupon the short circuit state between the welding wire 100 and the workpiece 200 is released and an arc is generated. In FIG. 2A, a period from a time t1 to t3 is the short circuit period, and a period from a time t3 to t10 is the arc period.

In the short circuit period, the short circuit state is started at the time t1. The start of the short circuit state corresponds to a state where a droplet X formed at the end of the welding wire 100 comes into contact with a molten weld pool Y formed in the workpiece 200.

After the occurrence of the short circuit, the welding current is gradually decreased for a span until reaching the time t2. As a result, sputtering is suppressed from generating in a process of the transition to the short circuit state.

After passing the time t2, the welding current is gradually increased for a span until reaching the time t3. A peak current value P3 at the time t3 may be set to 350 A, for example. With the increase of the welding current, a constricted part K is generated in the droplet X that is formed at the end of the welding wire 100. At the time t3, the droplet X transfers to the molten weld pool Y from the welding wire 100. As a result, the short circuit state is released, and the short circuit period is ended.

With the transfer of the droplet X to the molten weld pool Y from the welding wire 100 at the time t3, an arc Z is generated between the welding wire 100 and the molten weld pool Y, and the arc period is started. The welding current is then quickly decreased in a span until reaching the time t4. As a result, pressure acting the molten weld pool Y upon the generation of the arc Z is reduced, and the generation of sputtering is suppressed. In the illustrated example, the state where the welding current is quickly reduced is maintained during a span from the time t4 to t5 (see, an ARC 1 period in FIG. 2A).

The welding current is then increased during a period from the time t5 to t6 and is further maintained at a substantially constant level during a period from the time t6 to t7. As a result, the droplet X is grown again, and the stable arc Z is generated (see, an ARC 2 period).

After the time t7, the welding current is gradually decreased for a span until reaching the time t10 (see, an ARC 3 period and an ARC 4 period). During these periods, the welding apparatus waits for that the droplet X generated on the welding wire 100 comes into contact with the molten weld pool Y and the short circuit occurs again. The purpose of decreasing the welding current is to suppress the generation of sputtering when the short circuit occurs again.

After the short circuit has occurred again, the welding apparatus is returned to the state at the time t1 and repeats similar current waveform control to that described above.

FIG. 3A is a chart depicting one example of the waveform of the welding current when the arc welding is terminated. In FIG. 3A, a horizontal axis represents time, and a vertical axis represents a value of the welding current. In FIG. 3A, for easier understanding of the explanation, the waveform of the welding current illustrated in FIG. 2A is also depicted by a dotted line.

FIG. 3B successively illustrates states of the end of the welding wire 100 in time sequence when the arc welding is terminated.

The waveform of the welding current illustrated in FIG. 3A is similar, during the short circuit period, to the waveform of the welding current illustrated in FIG. 2A.

During the arc period, however, both the waveforms are different in the following points. First, an ARC 5 period from the time t10 to t13 is additionally set in the waveform of the welding current illustrated in FIG. 3A. In the ARC 5 period, the welding current is controlled to have a pulse waveform.

Secondly, from the ARC 1 period to the ARC 4 period, the welding current is controlled to be held at a lower value than that in the case of FIG. 2A. Thus, during a span from the ARC 1 period to the ARC 4 period, the arc Z is generated, but the intensity of the arc Z is lower than that in the case of FIG. 2A. Thirdly, during the span from the ARC 1 period to the ARC 4 period, the welding current is held at a substantially constant current value (constant current). The constant current value is, e.g., 30 A.

In other words, this embodiment is featured in that the arc period after the short circuit period in FIG. 2A is modified and the pulse waveform is added after the lapse of a time corresponding to the arc period in FIG. 2A.

In this embodiment, because the welding current has the pulse waveform in the ARC 5 period, the droplet X formed at the end of the welding wire 100 is extendedly raised as illustrated in FIG. 3B. With the rise of the droplet X, slag S formed on the droplet surface is moved to a side portion of the droplet X. After the ARC 5 period, the welding current is reduced to 0 A, and the droplet X is naturally solidified as it is. Thus, the slag S is fixated with the solidification of the droplet X while remaining in a state moved to the side portion of the droplet X. Accordingly, the slag S is avoided from being positioned between the welding wire 100 and the workpiece 200 at the arc start, and conduction of the short circuit current can be prevented from being impeded by the slag S.

Figure 4A:
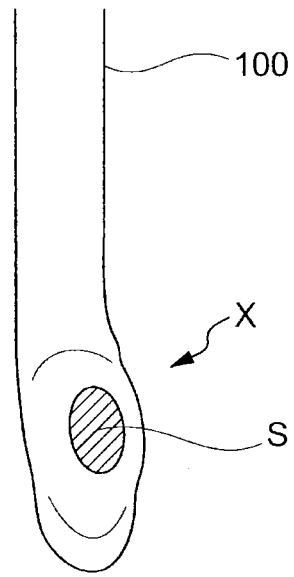
FIGS. 4A and 4B comparatively illustrate solidified droplets between the case where an ARC 5 period is added and the case where the ARC 5 period is not added when the arc welding is terminated.
Figure 4B:
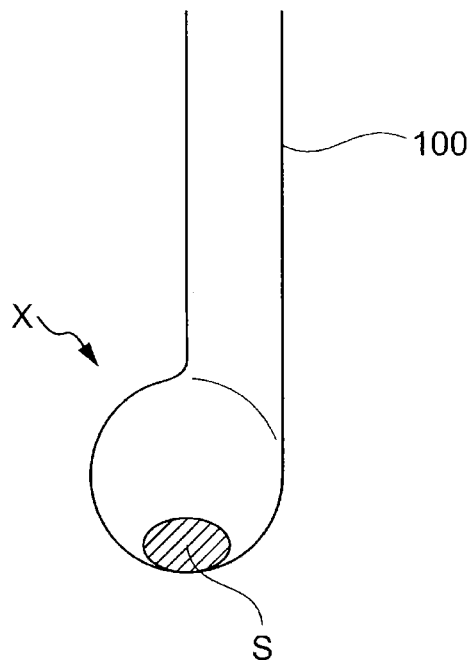

FIGS. 4A and 4B comparatively illustrate the solidified droplets X between the case where the ARC 5 period is added and the case where the ARC 5 period is not added when the arc welding is terminated. FIG. 4A illustrates a state of the solidified droplet X in the case where the ARC 5 period is added, and FIG. 4B illustrates a state of the solidified droplet X in the case where the ARC 5 period is not added.

When the ARC 5 period is added, as illustrated in FIG. 4A, the droplet X formed at the end of the welding wire 100 is solidified in an extendedly raised state, and the droplet X takes a pencil-like shape. In this case, the slag S is formed in the side portion of the droplet X.

On the other hand, when the ARC 5 period is not added, as illustrated in FIG. 4B, the droplet X formed at the end of the welding wire 100 is not raised and is solidified in a substantially spherical shape. In this case, the slag S is formed in a lower portion of the droplet X by the action of gravity. In other words, the slag S is formed between the welding wire 100 and the workpiece 200.

Thus, in this embodiment, the slag S being an insulator is less likely to be formed at a position between the welding wire 100 and the workpiece 200 when the arc is to be started. This suppresses a phenomenon that the short circuit current becomes hard to flow between the welding wire 100 and the workpiece 200 at the arc start. As a result, the arc start failure is less likely to occur.

When the welding wire 100 is fed from the wire feeder 30, the feed of the welding wire 100 is not immediately stopped due to inertia in spite of issuance of an instruction to terminate the welding, and the welding apparatus comes into the short circuit state again after the ARC 5 period illustrated in FIG. 3A in some cases. In such a case, the welding current having the waveform illustrated in FIG. 3A is applied again. In other words, the ARC 1 period to the ARC 5 period are repeated again after the short circuit period. Then, the arc welding is terminated by applying the pulse wave in the ARC 5 period after coming into a state where the feed of the welding wire 100 is stopped and the short circuit does not occur any more. As described above, when the short circuit has occurred after the instruction to terminate the welding, control of applying the pulse wave again is executed, and the arc welding is terminated at timing at which the welding wire 100 being fed by the action of inertia is stopped. Usually, the welding current corresponding to two or three waveforms is applied until the welding wire 100 is stopped after the instruction to terminate the welding.

<Arc Welding Method>

The arc welding method according to the embodiment will be described below.

FIG. 5 is a flowchart referenced to explain the arc welding method according to the embodiment.

In accordance with a predetermined sequence, the welding wire 100 is fed by the wire feeder 30, and the welding current is supplied to the welding wire 100. When the welding wire 100 and the workpiece 200 come into a closely-positioned or contacted state, the arc welding is performed.

During the arc welding, the welding current supplied to the welding wire 100 is controlled to have the current waveform illustrated in FIG. 2A, and the welding is performed on the workpiece 200 (step S101: welding step).

In accordance with the instruction to terminate the welding, the welding of the workpiece 200 is terminated (step S102).

The feed of the welding wire 100 from the wire feeder 30 is stopped (step S103).

Immediately before stop of the arc (i.e., during a droplet removal control period), the droplet size is controlled. More specifically, the welding current, which is set to have a minimum value during a span from the ARC 1 period to the ARC 4 period and to additionally include the ARC 5 period as illustrated in FIG. 3A, is supplied (step S104).

The power supply 50 determines, depending on the result of detecting a short circuit, whether the short circuit state has occurred again within a predetermined time after the ARC 5 period (step S105).

If the short circuit state has not occurred again (NO in step S105), the arc welding is terminated.

On the other hand, if the short circuit is detected (YES in step S105), the process is returned to step S104. Stated in another way, the welding current illustrated in FIG. 3A is set again, and the welding current including the ARC 5 period is supplied to the welding torch 10 and the workpiece 200 again.

The above-described steps 103 to 105 can be regarded as a welding termination step of executing control to apply the welding current of which waveform has a pulse waveform when the welding of the workpiece 200 is terminated.

<Modifications>

While, in the above example, the welding current is increased and decreased under a constant voltage as depicted in FIGS. 2A and 3A, the present invention is not limited to the above example.

FIG. 6A is a chart depicting another example of the waveform of the welding current output from the power supply 50 during the arc welding.

FIG. 6B successively illustrates states of the end of the welding wire 100 in time sequence during the arc welding.

The arc welding performed in accordance with the welding current described here is featured in that it is carried out as a non-short-circuited operation not including the short circuit period. Another feature is an ability of reducing sputtering and fume. The welding current used in this modification is a combination of two pulses. Those two pulses have rectangular waveforms, and their pulse peaks and pulse widths are different from each other. Herein, preceding one of the two pulses is called a first pulse, and succeeding one of the two pulses is called a second pulse.

For example, the first pulse is set to have a peak current Ip1 of 300 A to 700 A, and a peak period Tp1, i.e., a pulse width, of 0.3 ms to 0.5 ms. A base period Tb1, i.e., a period between the first pulse and the second pulse, is 0.3 ms to 10 ms, and a base current Ib1 in the base period Tb1 is 30 A to 200 A. The second pulse is set to have a peak current Ip2 of 200 A to 600 A, and a peak period Tp2, i.e., a pulse width, of 1.0 ms to 15 ms. A base period Tb2, i.e., a period subsequent to the second pulse is 3.0 ms to 20 ms, and a base current Ib2 in the base period Tb2 is 30 A to 200 A. It is to be noted that FIG. 6A represents an example in which the base current Ib1 and the base current Ib2 are set to the same current value.

As illustrated in FIG. 6B, at a time t21, the droplet X is formed at the end of the welding wire 100, and the constricted part K starts to be generated in the droplet X. During a period from a time t22 to t23, the constricted part K of the droplet X is grown by applying the first pulse.

During a period from the time t23 to t24, the droplet X transfers to the molten weld pool Y from the welding wire 100.

During a period from the time t24 to t25, a larger arc Z is generated between the welding wire 100 and the molten weld pool Y by applying the second pulse.

After the time t25, the droplet X is grown again by applying the base current Ib2.

Thereafter, the process is returned to the state at the time t21 again, and similar operations to those described above are repeated.

FIG. 7A is a chart depicting another example of the waveform of the welding current when the arc welding is terminated. Also in FIG. 7A, a horizontal axis represents time, and a vertical axis represents a value of the welding current.

FIG. 7B successively illustrates states of the end of the welding wire 100 in time sequence when the arc welding is terminated.

In the waveform of a welding current illustrated in FIG. 7A, the second pulse has a different (trapezoidal) pulse waveform from that of the second pulse illustrated in FIG. 6A.

In this modification, by setting the trapezoidal pulse waveform as the waveform of the applied welding current, a droplet X formed at the end of the welding wire 100 is extendedly raised. With the rise of the droplet X, slag S is moved to a side portion of the droplet X. The droplet X is then solidified, as it is, through natural cooling. Thus, also in this modification, the slag S is moved to the side portion of the droplet X and is fixated with the solidification of the droplet X. Accordingly, the slag S is avoided from being positioned between the welding wire 100 and the workpiece 200 at the arc start.

Since a period in which the trapezoidal pulse waveform is applied is present immediately after the droplet X has departed from the welding wire 100 in the period of the time t23 to t24, the droplet X is not yet grown to a large size. For that reason, preferably, a peak current Ip2 of the trapezoidal pulse waveform illustrated in FIG. 7A is set to be larger than that of the pulse waveform illustrated in FIG. 3A, and a peak period Tp2 of the trapezoidal pulse waveform illustrated in FIG. 7A is set to be larger than that of the pulse waveform illustrated in FIG. 3A.

While the pulse waveforms of the second pulses illustrated in FIGS. 6A and 7A are assumed to have the same peak current and peak period in this modification, they may be different in the peak current and the peak period.

<Pulse Waveform in ARC 5 Period>

The pulse waveform will be described in detail below. The following description is made in connection with, for example, the pulse waveform illustrated in FIG. 3A.

Figure 8:
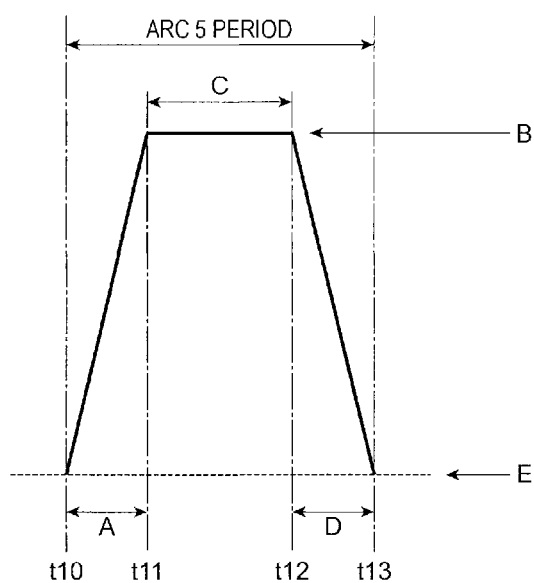
FIG. 8 is a chart referenced to explain a pulse waveform in the embodiment.

Here, the expression that "the welding current has the pulse waveform" means the case where the waveform of the welding current is quadrangular (trapezoidal) as illustrated in FIG. 8. More specifically, during a period from the time t10, i.e., the start time of the ARC 5 period, to the time t11, the welding current is linearly increased from a base current value E to a peak current value B for a time A (first period: t10 to t11). During a period from the time t11 to t12, the peak current value B is maintained constant to provide a substantially constant current for a time C (second period: t11 to t12). During a period from the time t12 to t13, the welding current is linearly decreased from the peak current value B to the base current value E for a time D (third period: t12 to t13).

In this embodiment, preferable ranges of the times A, C and D and the current values B and E were determined by carrying out measurements while changing those parameters as follows. In the following description, those parameters are also simply called A, C, D, B, and E.

FIG. 9 lists the results of studies made on the parameters A, B, C, D and E. FIG. 9 includes EXAMPLES 1 to 21 to indicate how the incidence of the arc start failure is changed when A, B, C, D and E are changed as indicated in FIG. 9. FIG. 9 further includes COMPARATIVE EXAMPLE in which the ARC 5 period is not added. Although EXAMPLES 7, 10, 11 and 19 among EXAMPLES 1 to 21 have the same conditions in A, B, C, D and E, they are separately included in FIG. 9 for easier understanding of explanation.

Here, a mark "⊚" represents the case where the incidence of the arc start failure is 0%. A mark "o" represents the case where the incidence of the arc start failure is more than 0% and less than 2%. A mark "A" represents the case where the incidence of the arc start failure is not less than 2% and less than 5%. A mark "x" represents COMPARATIVE EXAMPLE in which the incidence of the arc start failure is 5%. In each of EXAMPLES 1 to 21 and COMPARATIVE EXAMPLE, the arc start was repeated 300 times, and the incidence of the arc start failure was calculated from the results of the repeated arc starts.

The studies were first made on the time A.

As denoted in FIG. 9, in EXAMPLES 1 to 3, B to E were held fixed, while the time A was changed to 1.0 ms, 2.0 ms, and 5.0 ms. For each value of the time A, whether the arc start failure occurred or not was checked, and a position where the solidified droplet X was formed in the slag S was observed.

In any of EXAMPLES 1 to 3, the incidence of the arc start failure was less than 5%. In EXAMPLES 1 to 3, the end of the welding wire 100 was solidified in a spherical shape, and the slag S was formed at the bottom of the solidified sphere. In EXAMPLES 1 to 3, the solidified sphere at the end of the welding wire 100 had a diameter of, e.g., 2.0 mm, which was larger than 1.5 mm in COMPARATIVE EXAMPLE. It is thought that, since the end of the welding wire 100 was formed into the relatively large sphere, the incidence of the arc start failure was reduced in spite of the slag S being formed at the bottom of the sphere.

From the results of EXAMPLES 1 to 3, it is determined that the time A (i.e., the first period) is preferably not shorter than 0.1 ms and more preferably not shorter than 0.5 ms. Furthermore, it is determined that the time A is preferably not longer than 5.0 ms and more preferably not longer than 2.0 ms.

Then, the studies were made on the current value B.

As denoted in FIG. 9, in EXAMPLES 4 to 7, A, C, D and E were held fixed, while the current value B was changed to 150 A, 200 A, 250 A, and 300 A. From the results of EXAMPLES 1 to 3, the time A was set to 2.0 ms falling in the more preferable range. Whether the arc start failure occurred or not was checked, and a position where the solidified droplet X was formed in the slag S was observed by employing a microscope.

In any of EXAMPLES 4 to 7, the incidence of the arc start failure was less than 5%. However, the incidence of the arc start failure in EXAMPLES 6 and 7 was reduced in comparison with that in EXAMPLES 4 and 5; namely, it was 0%.

In EXAMPLES 4 and 5, the end of the welding wire 100 was solidified in a spherical shape, and the slag S was formed at the bottom of the spherical shape. On the other hand, in EXAMPLES 6 and 7, the end of the welding wire 100 was extendedly raised and solidified in a pencil-like shape, and the slag S was formed in a side portion of the pencil shape. It is thought that, with such a difference in the formed position of the slag S, the arc start failure was less likely to occur in EXAMPLES 6 and 7 than in EXAMPLES 4 and 5.

From the results of EXAMPLES 4 to 7, it is determined that the current value B (i.e., the welding current in the second period) is preferably not less than 200 A and more preferably not less than 250 A. Furthermore, it is determined that the current value B is preferably not more than 500 A and more preferably not more than 300 A.

Furthermore, the studies were made on the time C.

As denoted in FIG. 9, in EXAMPLES 8 to 10, A, B, D and E were held fixed, while the time C was changed to 0.1 ms, 1.0 ms, and 3.0 ms. From the results of EXAMPLES 1 to 7, the time A was set to 2.0 ms and the current value B was set to 300 A, each falling in the more preferable range. Whether the arc start failure occurred or not was checked, and a position where the solidified droplet X was formed in the slag S was observed.

In any of EXAMPLES 8 to 10, the incidence of the arc start failure was less than 5%. However, the incidence of the arc start failure was reduced in EXAMPLES 9 and 10 in comparison with that in EXAMPLE 8.

In EXAMPLE 8, the end of the welding wire 100 was solidified in a spherical shape, and the slag S was formed at the bottom of the spherical shape. On the other hand, in EXAMPLES 9 and 10, the end of the welding wire 100 was extendedly raised and solidified in a pencil-like shape, and the slag S was formed in a side portion of the pencil shape. It is thought that, with such a difference in the formed position of the slag S, the arc start failure was less likely to occur in EXAMPLES 9 and 10 than in EXAMPLE 8.

From the results of EXAMPLES 8 to 10, it is determined that the time C (i.e., the second period) is preferably not shorter than 1.0 ms. Furthermore, it is determined that the time C is preferably not longer than 5.0 ms.

Moreover, the studies were made on the time D.

As denoted in FIG. 9, in EXAMPLES 11 to 18, A, C and E were held fixed, and the current value B was set to 300 A or 120 A. At each current value B, the time D was changed to 0.1 ms, 1.0 ms, 3.0 ms, and 10.0 ms. From the results of EXAMPLES 1 to 10, the time A was set to 2.0 ms and the time C was set to 3.0 ms, each falling in the more preferable range. Whether the arc start failure occurred or not was checked, and a position where the solidified droplet X was formed in the slag S was observed.

In any of EXAMPLES 11 to 18, the incidence of the arc start failure was less than 5%. When the current value B was 300 A, the arc start failure was less likely to occur at a shorter value of the time D. On the other hand, when the current value B was 120 A, the arc start failure was least likely to occur at the time D of 3.0 A. In other words, a probability in prevention of the arc start failure in the case of changing the time D was changed depending on the current value B. The end of the welding wire 100 was extendedly raised and solidified in a pencil-like shape, and the slag S was formed in a side portion of the pencil shape.

From the results of EXAMPLES 11 to 18, it is determined that, though depending on the current value B, the time D (i.e., the third period) is preferably not shorter than 0.1 ms and more preferably not shorter than 0.5 ms. Furthermore, it is determined that the time D is preferably not longer than 5.0 ms and more preferably not longer than 2.0 ms.

In addition, the studies were made on the current value E.

As denoted in FIG. 9, in EXAMPLES 19 to 21, A, B, C and D were held fixed, while the current value E was changed to 1.0 A, 20 A, and 50 A. From the results of EXAMPLES 1 to 18, the time A was set to 2.0 ms, the current value B was set to 300 A, the time C was set to 3.0 ms, and the time D was set to 0.1 ms, each falling in the more preferable range. Whether the arc start failure occurred or not was checked, and a position where the solidified droplet X was formed in the slag S was observed.

In any of EXAMPLES 19 to 21, the incidence of the arc start failure was less than 5%. More specifically, the incidence of the arc start failure was lower at a smaller value of the current value E. The end of the welding wire 100 was extendedly raised and solidified in a pencil-like shape, and the slag S was formed in a side portion of the pencil shape.

From the results of EXAMPLES 19 to 21, it is determined that the current value E (i.e., the welding current in the third period) is preferably not less than 0 A. Furthermore, it is determined that the current value E is preferably not more than 50 A.

According to the embodiment, as described above, the incidence of the arc start failure is reduced in the case of adding the pulse waveform in comparison with the case of not adding the pulse waveform.

When the end of the welding wire 100 is extendedly raised and solidified in a pencil-like shape, the incidence of the arc start failure is further reduced. In order to obtain such a result, the current value B is required to be set not less than 250 A, and the time C (i.e., the second period) during which the peak current value B is maintained is required to be set not shorter than 1.0 ms. Stated in another way, by applying the pulse waveform satisfying the above conditions, a force acting to extendedly raise the droplet X formed at the end of the welding wire 100 is generated. Because such a force is determined depending on the peak current value B and the time C during which the peak current value B is maintained, the peak current value B is required to be not less than the predetermined current value and to be maintained for a period not shorter than the predetermined duration time. Furthermore, a rising time A (i.e., the first period) during which the current value is gradually increased from the base current value E to the peak current value B is set to fall in the predetermined range to avoid the above-mentioned force from being quickly generated, thereby suppressing scattering of the droplet X. Moreover, a falling time D (i.e., the third period) during which the current value is gradually decreased from the peak current value B to the base current value E is set to fall in the predetermined range to avoid the above-mentioned force from being quickly released, thereby making the extendedly raised state of the droplet X harder to change. As a result, the droplet X is more easily solidified in the extendedly raised state, and the slag S is more easily formed in the side portion of the solidified droplet X.

In the embodiment, there is no necessity of feedback control for holding the welding current as a constant current up to the end of a solidification time. Therefore, a control mechanism can be simplified.

What is claimed is:

1. An arc welding method, comprising:
employing a $CO_2$ gas as shield gas;
supplying a welding current to flow between a welding wire and a workpiece to be welded while feeding the welding wire toward the workpiece;
generating an arc with the welding current;
performing the welding of the workpiece while executing control to adjust the we current; and
wherein, when the welding of the workpiece is terminated, the executing control applies the welding current having a trapezoidal waveform, and
wherein, when the welding of the workpiece is terminated, the welding current having the trapezoidal waveform is additionally reapplied upon occurrence of a short circuit in the executing.

2. The arc welding method according to claim 1, wherein, in the executing, the welding current having the trapezoidal waveform is applied in an arc period during which an arc is generated after a short circuit period during which a short circuit occurs.

3. The arc welding method according to claim 2, wherein, in the executing, the welding current during the arc period is a constant current.

4. The arc welding method according to claim 1, wherein the trapezoidal waveform includes a first period during which the welding current is linearly increased, a second period during which the welding current is a constant current, and a third period during which the welding current is linearly decreased,
the first period is selected from a range of not shorter than 0.5 ms and not longer than 2.0 ms,
the second period is selected from a range of not shorter than 1.0 ms and not longer than 5.0 ms, and
the third period is selected from a range of not shorter than 0.5 ms and not longer than 2.0 ms.

5. The arc welding method according to claim 4, wherein the welding current during the second period is selected from a range of not less than 250 A and not more than 300 A, and
the welding current before the first period and the welding current after the third period are each selected from a range of more than 0 A and not more than 50 A.

6. The arc welding method according to claim wherein, in the executing, the waveform of the welding current includes a rectangular waveform and the trapezoidal waveform.

7. The arc welding method according to claim 1, wherein a droplet is formed at an end of the welding wire during the performing, and a slag formed at an end of the droplet is moved to a side portion of the droplet during the executing.

8. The arc welding method according to claim 7, further comprising solidifying the slag at the side portion of the droplet.

9. The arc welding method according to claim 8, further restarting arc welding, wherein the slag is not located between the welding wire and the workpiece.

10. The arc welding method according to claim 1, further comprising stopping a feed of the welding wire before the executing.

\* \* \* \* \*